United States Patent [19]

Desmond et al.

[11] Patent Number: 4,686,203

[45] Date of Patent: Aug. 11, 1987

[54] METHOD FOR THE DIGESTION-PRECIPITATION OF HIGH ACTIVITY CATALYSTS

[75] Inventors: Michael J. Desmond, Cleveland Heights; Marc A. Pepera, Northfield Center, both of Ohio

[73] Assignee: The Standard Oil Company, Cleveland, Ohio

[21] Appl. No.: 747,585

[22] Filed: Jun. 24, 1985

Related U.S. Application Data

[63] Continuation-in-part of Ser. No. 679,094, Dec. 6, 1984, abandoned, which is a continuation-in-part of Ser. No. 504,717, Jun. 15, 1983, abandoned.

[51] Int. Cl.$^4$ .......................... B01J 23/72; B01J 23/74
[52] U.S. Cl. .................................... 502/331; 502/330; 502/336; 502/513
[58] Field of Search ............... 502/325, 337, 338, 340, 502/343, 344, 345, 346, 513, 330, 331, 336

[56] References Cited

U.S. PATENT DOCUMENTS

| | | | |
|---|---|---|---|
| 2,564,331 | 8/1951 | Hawley | 502/337 |
| 2,776,244 | 1/1957 | Sowerwine | 502/337 |
| 2,786,817 | 3/1957 | Rottig et al. | 502/338 |
| 3,519,575 | 7/1970 | Bozik et al. | 502/337 |
| 4,124,629 | 11/1978 | Hansford | 502/337 |

*Primary Examiner*—W. J. Shine
*Attorney, Agent, or Firm*—Larry W. Evans; David J. Untener; Raymond F. Keller

[57] ABSTRACT

A metal oxide catalyst of high surface area is prepared by dissolving a metal salt in a polar organic solvent, precipitating the metal from solution in a form thermally decomposable to the oxide by means of a precipitating agent which is sparingly soluble in the solution, separating the precipitate, drying and calcining to form the metal oxide. The technique is particularly suitable for the preparation of Group VIIIA metal oxide catalysts which are useful for the conversion of carbon monoxide to hydrocarbons.

11 Claims, No Drawings

METHOD FOR THE DIGESTION-PRECIPITATION OF HIGH ACTIVITY CATALYSTS

This application is a continuation-in-part of application Ser. No. 679,094 filed on Dec. 6, 1984 itself a continuation-in-part of application Ser. No. 504,717 filed June 15, 1983, both now abandoned.

BACKGROUND OF THE INVENTION

1. Field of the Invention

This invention relates to a method for the preparation of high surface area catalysts, particularly Group VIIIA metal-containing catalysts, and to the use of Group VIIIA metal-containing catalysts for the reduction of carbon monoxide to produce hydrocarbons and oxygenates.

2. Description of Art

The desirability of preparing catalysts with a high surface area in order to obtain high activity is well known. A variety of techniques have been previously described for the preparation of metal-containing catalysts and include impregnation, precipitation and ion-exchange. Usually these techniques involve using the catalyst components in an aqueous solvent.

For example, U.S. Pat. Nos. 4,124,629, 2,786,817, 2,776,244 and 2,564,331 describe techniques for preparing catalysts in which metals are precipitated from aqueous solutions of the metal salts.

Of these references, U.S. Pat. No. 4,124,629 describes a process in which an iron-containing catalyst is precipitated by hydrolyzing urea in an aqueous solution of an aluminum salt and an iron salt. U.S. Pat. No. 2,564,331 describes a technique for the coprecipitation of nickel, zirconium catalysts from aqueous solution containing excess carbonate ions. U.S. Pat. No. 2,776,244 describes the preparation of nickel peroxide catalysts by reaction of nickel sulfate with a water soluble inorganic base such as an alkali metal carbonate while the pH is maintained below 9. Finally U.S. Pat. No. 2,786,817 describes the preparation of iron-containing catalysts by dissolving iron sulfate in water and then precipitating the iron with an alkali such as caustic soda solution.

According to the present invention the metal is precipitated from a polar organic solvent employing a precipitating agent having a solubility of between about $1 \times 10^{-1}$ and about $1 \times 10^{-6}$ moles per 1000 grams of solvent at 25° C. This causes the metal to be slowly or digestively precipitated from solution and the resulting catalysts exhibit higher surface areas than those obtained using previously described techniques, and also require less activation prior to use.

SUMMARY OF THE INVENTION

According to this invention, metal oxide catalysts are prepared by the method comprising: (a) dissolving a metal salt in a polar organic solvent to form a solution, (b) adding to said solution a precipitating agent capable of reacting with the metal species in said solution to form a precipitate of the metal thermally decomposable to the oxide, said precipitating agent having a solubility of less than that of the metal salt and being from about $1 \times 10^{-1}$ to about $1 \times 10^{-6}$ moles of precipitating agent per 1000 grams of solvent at 25° C., (c) separating said precipitate from said solvent, and (d) drying and calcining said precipitate to form the metal oxide catalyst.

The term metal oxide as used herein is not intended to mean that all the metal is in the form of the oxide, and includes catalysts which are a mixture of oxide and zerovalent or elemental metal as, for example, are copper-containing catalysts after the calcination step.

Group VIIIA metal oxide catalyst are particularly suitable for preparation in this manner. These catalysts are useful for the reduction of carbon oxides to produce hydrocarbons.

The form of the Periodic Table employed in this specification is that published by Sargent-Welch Scientific Company of Skokie, Ill., U.S.A. in 1979. In this version of the Periodic Table, the rare gases constitute Group VIII and the metals Fe, Co, Ni, Ru, Rh, Pd, Os, Ir and Pt constitute Group VIIIA.

DETAILED DESCRIPTION OF THE INVENTION

Catalyst Preparation

Suitable metal salts for use in the catalyst preparation include, but are not limited to those of Group VIIIA, IB and IIB metals although other metals which are sufficiently soluble in the solvent and insolubilize in the presence of the precipitating agent can be used.

The metal salt can be a metal halide, perchlorate, sulfate, phosphate, alkoxide, nitrate, acetate, and the like, or in the form of an organo-metallic compound.

The precipitating agent can be a metal compound which reacts with the Group VIIIA metal species to form an insoluble component which slowly precipitates from the solvent. The precipitating agent should be only slightly soluble in the solvent such that the precipitating agent dissolves in the solvent as a function of concentration, time and temperature until reaching equilibrium.

Although no wanting to be bound to theory, it is believed that the dissolved precipitating agent reacts with the solubilized metal species to form a highly insoluble metal species or compound which precipitates from solution. As the solubilized precipitating agent reacts with the solubilized metal species, the equilibrium balance is disrupted solubilizing more precipitating agent in order to again reach equilibrium. In this manner, the precipitating agent slowly or digestively precipitates the metal species from solution to form the active catalyst. The reaction preferably proceeds until at least 50% by weight of the metal components form insoluble hydrolysis products.

Although the above explanation is simplified, it does illustrate how the present invention is believed to proceed. In application, it is important that the precipitating agent be capable of converting the metal species or compounds to species which are less soluble in the solvent than the precipitating agent itself.

As mentioned above, the precipitating agent should be only slightly soluble in the polar organic solvent under the reaction conditions. As stated above, the precipitating agent has a molar solubility in the particular solvent of from about $1 \times 10^{-1}$ to about $1 \times 10^{-6}$, and preferably about $1 \times 10^{-2}$ to about $1 \times 10^{-5}$ moles of precipitating agent/1000 grams of solvent.

It is possible for the precipitating agent to be incorporated into the metal oxide catalyst. For example, where the precipitating agent employed is sodium carbonate, sodium ions will be present in the precipitate and eventual metal oxide catalyst.

The precipitating agent can be a salt of a basic metal such as a salt of the alkali and alkaline earth metals, preferably Na, K, Rb, Cs, Mg, Ca, and Sr. The most preferred precipitating agents are carbonates of the alkali metals, such as $Na_2CO_3$, $K_2CO_3$, and the like. Supports can be added to the solvents in accordance with conventional precipitations techniques. Useful supports include, but are not limited to alumina, silica, alumina-silica, clays, molecular sieves and the like.

The polar organic solvents used in this invention can also vary widely. In accordance with this invention, a solvent is selected which only partially solubilizes the particular precipitating agent employed. Optionally small amounts of water, i.e. less than 10% by volume of the polar organic solvent may be present. Examples of polar organic solvents include, but are not limited to, alcohols, esters, amines, ethers, sulfides, thioethers, ketones, aldehydes, glycols and the like. Preferred organic solvents are alcohols, ketones, and glycols with alcohols being the most preferred. The preferred alcohol solvents include $C_1$-$C_{10}$ saturated alcohols with methanol, ethanol and propanol being most preferred.

The catalysts of this invention are prepared by dissolving the metal salt in the polar organic solvent. It may be necessary to heat the solvent to properly dissolve the metal salt and the solvent can be heated either prior to or after the addition of the metal salt. Typically, the solvent will be heated to temperatures above about 25° C. and preferably above about 50° C. although lower temperatures are suitable depending on the particular solvent employed. Next, the precipitating agent is added to the solution. The precipitating agent is conveniently added as a solid to the solution in an amount in excess of that which will dissolve in the solution. Conveniently the mixture is then agitated while maintaining the excess of precipitating agent present. After the precipitation period, from about one hour to about 30 days, preferably between 10 hours and 20 days, the solids are filtered, washed with water to separate the precipitated catalyst from the non-solubilized precipitating agent by dissolving the latter, and dried at temperatures above about 100° C. The precipitate is then calcined, for example, at temperatures above about 400° C. for a period of between about 3-5 hours after drying to thermally decompose the precipitate to the oxide and/or remove thermally removable components from the precipitate and thereby form the metal oxide catalyst.

The catalysts prepared by the method of the present invention can optionally contain various promoter metals.

The process of the present invention results in catalysts exhibiting higher surface areas than those prepared by previously described techniques. As is well known, catalysts with high surface areas generally exhibit higher activities than catalysts with low surface areas. Thus, the present invention provides a technique for preparing high activity catalysts.

Further, the inventive preparation additionally can result in catalysts exhibiting different metal oxide phases than found in those catalysts prepared by previously described techniques. This is particularly unusual in that the total amount of catalytic components are about the same when prepared by the inventive technique or previously described techniques. For example, the iron catalysts prepared by the inventive techniques have been shown by x-ray diffraction and infrared spectroscopy to exhibit a magnetite ($Fe_3O_4$) phase. Previously described preparation techniques, those using conventional "fast" precipitations, exhibit either a hematite (alpha $Fe_2O_3$) when precipitated from water or a maghemite (gamma $Fe_2O_3$) phase. It should be noted that magnetite is found as the dominant phase in reduced iron containing Fisher-Tropsch catalysts. In this respect, the digestive precipitation technique of the present invention eliminates or shortens the pretreatment or break-in time for the catalyst when used for the reduction of carbon oxides.

REACTION

The catalysts prepared by the method of this invention can be employed in carbon oxide reducing reactions, known as Fisher-Tropsch reactions. Typically, gases containing hydrogen and carbon monoxide (such as synthesis gas) can be reacted over the inventive catalyst to produce hydrocarbons and oxygenates. Typically, gases composed primarily of hydrogen and carbon monoxide having an $H_2$/CO ratio of about 0.1/1 to about 10/1 can be employed. Preferably, the $H_2$/CO ratio is from about 0.5/1 to about 3/1 for the production of hydrocarbons.

The catalyst of the present invention is contacted with the gaseous reactant in a suitable reactor. The reaction can be carried out either in a fluid-bed mode or a fixed bed mode, as is examplified herein, and can be either a continuous or batch type operation. The gas hourly space velocity can be from 50 to 5000 preferably from 100 to 1000.

The reaction pressure is also not critical and is normally from less than 1 to about 100 atmospheres. Although there is no real upper limit to the reaction pressure, pressures higher than about 100 atmospheres are normally not employed because of the high expense involved. Preferably, pressures are between about 1 and about 30 atmospheres are employed.

The reaction temperature for the Fisher-Tropsch reaction is generally between about 100° and about 500° C., preferably about 150° and about 350° C.

The Group VIII catalysts of the present invention exhibit high activity and can be used at lower reaction temperatures for high conversions to hydrocarbons than conventional catalysts. It has been found that by using lower reaction temperatures, such as between about 200° to about 300° C., high amounts of organic liquid products are produced. Further, the use of the catalyst of the present invention at low temperatures and pressures produces lower amounts of oxygenates and olefins than produced from conventionally precipitated catalysts. This is particularly important when the desired products are gasoline grade hydrocarbons.

SPECIFIC EMBODIMENTS

Catalyst Preparation

Comparative Example A

Fast Precipitation from Ethanol using KOH as Precipitating Agent

Ethanol (200 grams) was heated to about 50° C. and 202.01 grams of $Fe(NO_3)_3$ $9H_2O$ and 21.46 grams of $Cu(NO_3)_2$ $3H_2O$ were added to the hot ethanol. Two solutions of KOH dissolved in ethanol were prepared. (The solubility of KOH is ethanol at 25° C. is about 5.9 moles of KOH/1000 g of EtOH.) The first solution contained 95.4 grams of KOH dissolved in 250 grams of ethanol. The second solution contained 30 grams of KOH dissolved in 180 grams of ethanol. The first KOH solution was added to the iron and copper nitrate solution while stirring. While monitoring the pH of the solution, 106.6 grams of the second KOH solution was added to bring the pH of the solution to a value of 7.4. Kieselguhr (34.28 grams) was then added with stirring to the mixture. After half an hour, the solids were filtered and thoroughly washed with ethanol. The precipitate was then slurried with hot (about 70° C.) water and filtered. The catalyst was then dried at 150° C. overnight, sized to about 10/30 mesh and calcined for 4 hours at 500° C. The stoichiometric composition of the catalyst was 1(5Fe:Cu):1 Kieselguhr. The properties of this catalyst are shown in Table I.

EXAMPLE 1

Slow Precipitation from Ethanol using $K_2CO_3$ as Precipitating Agent $Fe(NO_3)_3$ $9H_2O$ (202.01 grams) and 24.16 grams of $Cu(NO_3)_2$ $3H_2O$ were added to about 600 ml of ethanol which was heated to about 50° C. The solution was cooled to about 25° C. and 34.28 grams of Kieselguhr and 123.4 grams of $K_2CO_3$ were added to the mixture. (The solubility of $K_2CO_3$ in ethanol at 25° C. is less than $6.5 \times 10^{-3}$ moles/1000 g EtOH.) The mixture was then stirred for about 15 days with the occasional addition of ethanol to maintain a constant volume. After 15 days the pH of the solution was about 8.9. The mixture was then filtered and the solids were washed in water and filtered 3 times. The solid was then dried at 150° C. overnight, sized to about 10/30 mesh and calcined for 4 hours at 500° C. The stoichiometric composition of the resulting catalyst was (5Fe:1Cu):1 Kieselguhr. The properties of this catalyst are shown in Table I.

COMPARATIVE EXAMPLE B

Fast Precipitation from Water $Fe^{II}Cl_2$ $4H_2O$ (223.65 grams), 60.84 grams of $Fe^{III}Cl_3$ and 45.0 grams of $CuCl_2$ $2H_2O$ were added to 1.5 liters of water while stirring to form a solution. The mixture was heated to about 80° C. A second solution was prepared containing 354.6 grams of $K_2CO_3$ $1.5H_2O$ dissolved in 700 ml of $H_2O$. The carbonate solution was then added to the Fe and Cu mixture. After about 30 minutes the precipitate was filtered and washed with water. The precipitate was then slurried twice with boiling water and filtered. The solid was then dried at 110° C. overnight. The stoichiometric composition of the catalyst was 5Fe:1Cu. The properties of this catalyst are shown in Table I.

Production of Hydrocarbons

Samples (20 cc) of the above catalysts (10-30 mesh) were placed in a fixed bed reactor and reduced at 250° C. under a flow of 50 SCCM CO, 50 SCCM $H_2$ and 900 SCCM $N_2$ at ambient pressure for 17-18 hours. The catalysts were then cooled to ambient temperature under continued gas flow. The pressure of the system was increased to 150 psi and $H_2$/CO was introduced into the reactor at 50 sccm, respectively. The temperature was increased in 5°-10° increments until a gas contraction ([gas into the reactor (sccm) − gas out of the reactor (sccm)] × 100) of greater than about 30% was obtained. The catalyst of Examples 1 and A were each run in two separate reactions. The results of these runs are shown in Table II.

TABLE I

| Example | Catalysts | Metal Composition % Fe | Cu | K | Surface Area $m^2/g$ | Iron Phase Present |
|---|---|---|---|---|---|---|
| 1 | ([5Fe:Cu]:Kieselguhr0 alcohol digestion (prio to calcination) | 33.6 | 9.9 | 0.73 | 76.6 | $Fe_3O_4$ Magnetite |
| A | ([5Fe:Cu]Kieselguhr) alcohol, fast precipitation | 34.3 | 10.2 | 0.66 | 30.5 | $Fe_2O_3$ Hematite |
| B | 5Fe:Cu watr, fast precipitation | 55.2 | 13.3 | 0.94 | 24.4 | $Fe_2O_3$ Maghemite |

TABLE II

Reaction Conditions and Product Properties for the Fisher-Tropsch Reaction*

| Example | Catalyst | Temp° c. | GHSV | SCCM Gas $H_2$ | Feed CO | Reaction Time Mins | % Volume Contraction | gm organic liquid/hr | Boiling Point Cutoff 90% | Avg. BP | % 204° C. |
|---|---|---|---|---|---|---|---|---|---|---|---|
| 1A | 1(5Fe:1Cu):1kieselguhr long digestion-$K_2CO_3$ Ethanol | 215 | 300 | 50 | 50 | 299 | 41.7 | 0.269 | — | — | — |
| 1B | 1(5Fe:1Cu):1kieselguhr long digestion-$K_2CO_3$ Ethanol | 210 | 450 | 100 | 50 | 941 | 42.9 | 0.314 | 311° C. | 173° C. | 67 |
| A Comparative | 1(5Fe:1Cu):1kieselguhr fast precipitation-KOH Ethanol | 225 | 300 | 50 | 50 | 277 | 34.9 | 0.182 | — | — | — |
| A Comparative | 1(5Fe:1Cu):1kieselguhr fast precipitation-KOH Ethanol | 220 | 450 | 100 | 50 | 986 | 31.0 | 0.162 | 328° C. | 186° C. | 64 |
| B Comparative | 5Fe:1Cu fast precipitation-$K_2CO_3$ water | 250 | 300 | 50 | 50 | 1090 | 31.0 | 0.300 | 391° C. | 211° C. | 54 |

*All examples were run at 150 psi pressure

The organic liquid recovered from the Examples of Table II contained paraffins as the major product, with about 25-30% olefins common for all samples. In addition to the olefins, the catalyst prepared from aqueous precipitation (Example B) produced 18–30% oxygenated components (alcohols and acids). The catalysts of Examples 1 and A produced no acids and less than 3% alcohols. However, the liquids produced from the catalyst prepared by the present invention, Example 1, are better suited as components of transportation fuels due to their lower overall oxygenate and normal olefin content.

As the data in Table II shows, the catalyst prepared by the inventive long digestion reaction (Example 1) exhibits good activity (as determined by contraction) in the 210°–220° C. temperature range. Additionally, the 40% and better organic liquid yield over Comparative Example A is a great advantage for the production of fuels. Further, over 65% of the organic product of Example 1A and 1B has a boiling point range in the gasoline range while the entire top end of the liquid is within the 90% distillation point of 338° C. as required for 2nd grade diesel fuel (Kirk Othmer, Petroleum (Products), Vol 17, page 268). On the other hand, the organic liquid yield of Example B, the aqueous precipitation, contains a top end which is unsuitable for diesel fuel as the 90% distillation point is over 50° C. above the required cut-off.

Thus it should be apparent to those skilled in art that the subject invention accomplishes the object set forth above. It is to be understood that the subject invention is not to be limited by the example said forth herein which had been provided merely to demonstrate operability. The scope of this invention includes equivalent embodiments, modifications, and variations that fall within the scope of the attached claims.

What is claimed is:

1. A method for preparing an iron-Group IB metal-containing metal oxide catalyst comprising;
   (a) dissolving at least an iron salt and a salt of a Group IB metal in a polar organic solvent to form a solution;
   (b) adding to said solution a precipitating agent capable of reacting with the metal species in said solution to form a precipitate of the metal thermally decomposable to the oxide, said precipitating agent having a solubility of less than that of the iron salt and Group IB metal salt and being from about $1 \times 10^{-1}$ to about $1 \times 10^{-6}$ moles of precipitating agent per 1000 grams of solvent at 25° C.;
   (c) separating said precipitate from said polar organic solvent; and
   (d) drying and calcining said precipitate to form said iron and Group IB metal-containing metal oxide catalyst.

2. The method as claimed in claim 1 wherein said polar organic solvent is selected from the group consisting of alcohols, ketones, and glycols.

3. The method as claimed in claim 2 wherein said polar organic solvent is a $C_1$–$C_{10}$ saturated alcohol.

4. The method as claimed in claim 3 wherein said polar organic solvent is selected from the group consisting of methanol, ethanol, and propanol.

5. The method as claimed in claim 1 which comprises adding the precipitating agent in the form of a solid to the solution in an amount in excess of that which will dissolve in the solution and agitating the mixture while maintaining the excess of precipitating agent present.

6. The method of claim 1 wherein said Group IB metal is copper.

7. The method of claim 1 wherein said metal oxide catalyst contains more than 50 mole percent of iron oxide.

8. The method of claim 1 wherein said precipitating agent is a salt of an alkali or alkaline earth metal.

9. The method of claim 8 wherein said precipitating agent is a carbonate of an alkali metal.

10. A method for the preparation of an iron oxide-containing catalyst in which the iron oxide is present as magnetite which method comprises:
    (a) dissolving an iron-containing compound in a polar organic solvent to form a solution,
    (b) adding to said solution a precipitating agent capable of reacting with the iron in said solution to form a precipitate of the iron thermally decomposable to the oxide, said precipitating agent having a solubility of less than that of the iron compound and being from about $1 \times 10^{-1}$ to $1 \times 10^{-6}$ moles of precipitating agent per 1000 grams of solvent at 25° C. and wherein the precipitating agent is added in the form of a solid in an amount in excess of that which will dissolve in the solvent and agitating the mixture while maintaining the excess of precipitating agent present,
    (c) separating said precipitate from said polar organic solvent, and
    (d) drying and calcining said precipitate to form said iron oxide catalyst containing magnetite.

11. The method of claim 10 which comprises dissolving a copper-containing compound in addition to said iron-containing compound in the polar organic solvent and precipitating both the copper and the iron to obtain a catalyst containing both iron and copper oxides.

* * * * *